United States Patent [19]
Koneda et al.

[11] Patent Number: 6,106,428
[45] Date of Patent: *Aug. 22, 2000

[54] COMPACT DUAL MODE CONTINUALLY VARIABLE TRANSMISSION

[75] Inventors: Phillip Thomas Koneda, Novi; Stephen John Agdorny, Ypsilanti; Thomas Arthur McGinn, White Lake, all of Mich.

[73] Assignee: Ford Global Technologies, Inc., Dearborn, Mich.

[*] Notice: This patent is subject to a terminal disclaimer.

[21] Appl. No.: 09/045,552

[22] Filed: Mar. 23, 1998

[51] Int. Cl.[7] .................................................... F16H 37/02
[52] U.S. Cl. .......................... 475/210; 475/211; 475/212
[58] Field of Search .................................... 475/210, 343, 475/209, 211, 212

[56] References Cited

U.S. PATENT DOCUMENTS

| | | | |
|---|---|---|---|
| 2,076,926 | 4/1937 | Timmerman | 74/286 |
| 3,110,189 | 11/1963 | Steuer | 74/230.17 |
| 3,203,277 | 8/1965 | General | 74/689 |
| 3,257,867 | 6/1966 | Dennick | 74/689 |
| 3,340,749 | 9/1967 | Magg et al. | 74/689 |
| 3,715,930 | 2/1973 | Beliveau et al. | 74/230.17 |
| 3,850,050 | 11/1974 | Lemmens | 74/689 |
| 3,924,480 | 12/1975 | Carapellucci | 74/230.17 |

(List continued on next page.)

FOREIGN PATENT DOCUMENTS

| | | | |
|---|---|---|---|
| 65463 | 3/1947 | Denmark | 475/211 |
| 0004130 A1 | 9/1979 | European Pat. Off. . | |
| 0413476B1 | 8/1990 | European Pat. Off. . | |
| 3543635 | 6/1986 | Germany | 475/211 |
| 4234747 | 12/1993 | Germany | 475/210 |
| 56-153147 | 11/1981 | Japan . | |
| 28047 | 2/1983 | Japan | 475/210 |
| 4-285354 | 10/1992 | Japan | 475/210 |
| 2025545A | 1/1980 | United Kingdom . | |
| 2180020A | 3/1987 | United Kingdom . | |
| 2233722 | 1/1991 | United Kingdom | 475/210 |

OTHER PUBLICATIONS

Paper 841305, International Conference on Fuel Efficient Powertrains and Vehicles, London, England Oct. 1984, "The Ford Research Dual Mode Continuously Variable Transmission", T.R. Stockton, pp. 117–123.

Paper 9636349, International Conference on Continuously Variable Power Transmissions, Sep. 11–12, 1996, Yokohama. Japan, "110—Dry Hybrid Belt DVT", M. Takayama, pp. 65–71.

Primary Examiner—Charles A. Marmor
Assistant Examiner—Tisha D. Waddell
Attorney, Agent, or Firm—James J. Dottavio

[57] ABSTRACT

A continually variable transmission includes an input shaft, an output shaft and a first drive mechanism having a first input on a first axis and a first output on a second axis. The first drive mechanism produces a fixed ratio of the speed of the first input to the speed of the first output. The first input drives the first output without a member on an intervening axis. A second drive mechanism is arranged in parallel with the first drive mechanism, having a second input and second output, for producing a stepless, continually variable range of ratios of the speed of the second input to the speed of the second output. A mode clutch alternately driveably connects and releases either the members of a first group consisting of the first input and second input or the members of a second group consisting of the first output and second output. A mechanism is provided for driving the output shaft in the same direction as the input shaft and for reversing the direction of rotation of the output shaft relative to the direction of rotation of the input shaft.

20 Claims, 5 Drawing Sheets

U.S. PATENT DOCUMENTS

| | | | |
|---|---|---|---|
| 4,043,225 | 8/1977 | Momose | 74/761 |
| 4,290,320 | 9/1981 | Abbott | 74/689 |
| 4,304,150 | 12/1981 | Lupo et al. | 74/677 |
| 4,329,888 | 5/1982 | Falzoni | 74/689 |
| 4,335,629 | 6/1982 | Falzoni | 74/689 |
| 4,342,238 | 8/1982 | Gardner | 74/689 |
| 4,354,401 | 10/1982 | Omitsu | 74/689 |
| 4,392,394 | 7/1983 | Hofbauer et al. | 74/689 |
| 4,458,559 | 7/1984 | Croswhite et al. | 74/730 |
| 4,467,670 | 8/1984 | Kawamoto | 74/689 |
| 4,543,852 | 10/1985 | Svab et al. | 74/695 |
| 4,589,303 | 5/1986 | Roberts | 74/689 |
| 4,599,916 | 7/1986 | Hirosawa | 74/689 |
| 4,608,032 | 8/1986 | Stockton et al. | 474/28 |
| 4,608,885 | 9/1986 | Koivunen | 74/689 |
| 4,624,153 | 11/1986 | Itoh et al. | 74/689 |
| 4,644,820 | 2/1987 | Macey et al. | 74/689 |
| 4,644,821 | 2/1987 | Sumiyoshi et al. | 74/689 |
| 4,784,630 | 11/1988 | Takahashi | 474/28 |
| 4,820,242 | 4/1989 | Sato | 474/8 |
| 4,836,049 | 6/1989 | Moan | 74/689 |
| 4,838,836 | 6/1989 | Sakai et al. | 474/28 |
| 4,852,427 | 8/1989 | van der Veen | 74/689 |
| 4,854,919 | 8/1989 | van Lith | 474/25 |
| 4,856,369 | 8/1989 | Stockton | 74/665 GE |
| 4,876,920 | 10/1989 | Eichenberger | 74/689 |
| 4,919,007 | 4/1990 | Van Der Hardt Abeson et al. | 474/72 |
| 4,946,429 | 8/1990 | Sherman | 475/210 |
| 5,048,371 | 9/1991 | Hendricks | 74/730.1 |
| 5,049,112 | 9/1991 | Gunsing | 474/8 |
| 5,098,345 | 3/1992 | Van Vuuren | 474/8 |
| 5,207,691 | 5/1993 | Doyle | 475/53 |
| 5,643,131 | 7/1997 | Kuhn et al. | 475/210 |
| 5,803,858 | 9/1998 | Haka | 475/210 |
| 5,853,343 | 12/1998 | Eggert et al. | 475/210 |

COMPACT DUAL MODE CONTINUALLY VARIABLE TRANSMISSION

BACKGROUND OF THE INVENTION

1. Technical Field

This invention relates to the field of continually variable transmissions that produce a stepless, continually variable range of speed ratios. More particularly, the invention pertains to a compact arrangement of such a transmission having fixed ratio and variable ratio drive mechanisms.

2. Description of the Prior Art

Automatic transmissions for automotive use that employ a belt drive, variable speed ratio mechanism, usually include a torque converter located in the driveline between the power source and the continually variable drive mechanism. At the lower speed ratios, the torque converter produces torque multiplication to assist accelerating the vehicle from rest. At higher speed ratios, the torque converter is locked up to produce a mechanical connection between its input and output, rather than the conventional hydrodynamic connection, to minimize losses inherent in its operation. At higher speed ratios, the belt drive mechanism alone produces the torque multiplication and speed reduction between the power source and drive wheels. However, in conventional continually variable transmission arrangements, acceleration of the vehicle from rest is only marginally acceptable when compared to current four-speed automatic transmission in current use.

In the design of continually variable transmissions, there is a long felt need to extend as much as practicable the range of speed ratios that can be produced by the belt drive mechanism and to minimize the torsional loads on the belt drive mechanism. Furthermore, it is known that in conventional continually variable transmissions that include a torque converter, the pumping losses during low speed operation, particularly when accelerating the vehicle from rest, are high, due to high clamping loads between the sheaves of the belt drive mechanism and the belt itself.

Copending patent application Ser. No. 08/697,964 describes an arrangement to address the above concerns, but which is difficult to package in small spaces. The present invention seeks to improve the package size of a dual mode CVT.

SUMMARY OF THE INVENTION

An object of this invention is to provide, in a continually variable automatic transmission, a low gear operating ratio that bypasses the belt drive mechanism and is operative only at low speed conditions in a compact package.

A first advantage of the use of a transmission according to the present invention is that the ratio range of the transmission can be extended by the difference between the speed ratio of the low gear mechanism and the lowest operating speed ratio of the belt drive mechanism in the underdrive range. This larger range allows for a larger engine speed to vehicle speed operating envelope. A broader operating envelope produces easier acceleration of the vehicle and better fuel economy. The layout for the speed reduction mechanisms of the present design is provided on two axes, thus minimizing the space required for the reductions.

A second advantage of the use of the transmission according to the present invention, is a reduction in the magnitude of loads applied to or developed in the belt drive mechanism. The belt drive mechanism only handles the peak engine torque, but not peak turbine torque, during a brake stall condition. This reduction in peak load, means that a transmission having a particular size belt drive mechanism can be applied to a larger engine displacement and power application than can conventional continually variable transmissions.

By using a low gear drive mechanism to bypass the belt drive mechanism, the pumping pressure required during vehicle acceleration from rest is limited to the pressure required to engage the hydraulically actuated friction clutches; therefore, the high pumping losses normally present in conventional single mode continually variable transmission required to driveably connect the drive belt and the sheaves on which it operates is eliminated. This reduction in pumping losses during vehicle acceleration allows greater engine torque to be available to accelerate the vehicle.

A continually variable transmission according to this invention includes an input shaft, an output shaft and a first drive mechanism having a first input on a first axis and a first output on a second axis. The first drive mechanism produces a fixed ratio of the speed of the first input to the speed of the first output. The first input drives the first output without a member on an intervening axis. A second drive mechanism is arranged in parallel with the first drive mechanism, having a second input and second output, for producing a stepless, continually variable range of ratios of the speed of the second input to the speed of the second output. A mode clutch alternately driveably connects and releases either the members of a first group consisting of the first input and second input or the members of a second group consisting of the first output and second output. A mechanism is provided for driving the output shaft in the same direction as the input shaft and for reversing the direction of rotation of the output shaft relative to the direction of rotation of the input shaft.

DESCRIPTION OF THE PREFERRED EMBODIMENT

Figure 1:
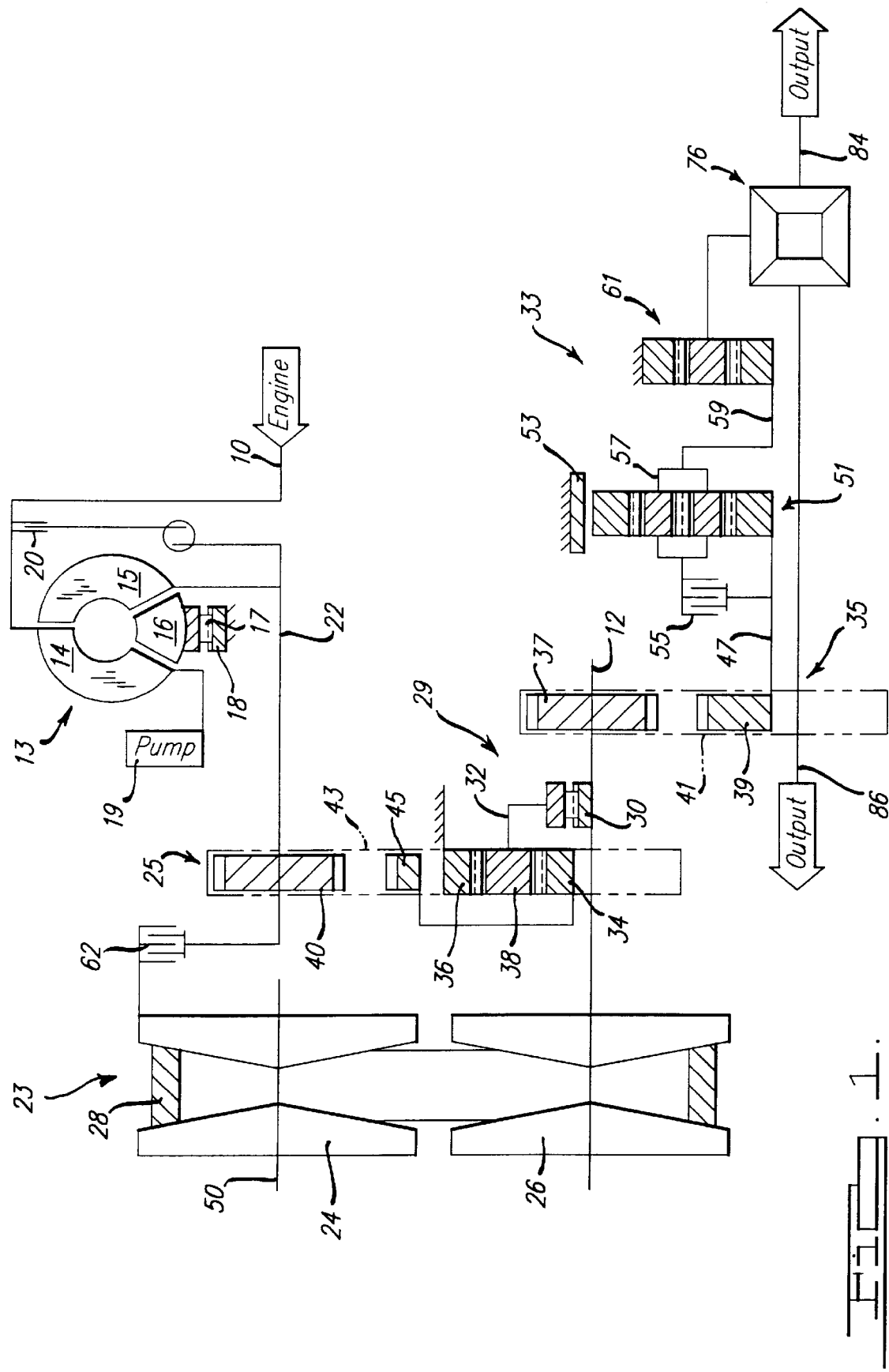
FIG. 1 is a schematic diagram of a continually variable transmission showing a belt drive mechanism having planetary and layshaft gearing and a torque converter.

Referring first to FIG. 1, a transmission according to this invention is adapted for connection to the crankshaft of an engine or the drive shaft of another power source and an output shaft 12, which is directly connected to a final drive mechanism 33.

A torque converter 13 has a bladed impeller wheel 14 hydrodynamically connected to a bladed turbine wheel 15. A hydraulically actuated bypass clutch 20 is engaged to connect mechanically the turbine and impeller, or is disengaged so that the connection between the impeller and turbine is entirely hydrodynamic. A bladed stator wheel 16 is rotatably supported on a fixed shaft 18, which holds the inner race of an overrunning clutch 17 fixed against rotation. Clutch 17 produces a one-way drive connection between stator wheel 16 and shaft 18. An oil pump 19 supplies hydraulic fluid to the toroidal path defined by impeller 14, turbine 15, and stator 16. The turbine rotates on an input shaft 22. A third shaft 50, supports the input sheave 24 of a belt drive mechanism, whose output sheave 26 is rotatably supported by output shaft 12.

A variable speed mechanism 23 includes a belt drive mechanism that produces a variable ratio of the speed of output shaft 12 to the speed of shaft 50 by selectively varying the radii on sheaves 24 and 26 where an endless flexible drive belt 28 engages the sheaves 24, 26. For example, when output shaft 12 is underdriven, the belt engages sheave 24 at a small radius and engages sheave 26 at a relatively large radius. The radius of the point of contact between the drive belt and the sheaves is controlled by moving the position of one of the sheaves of each of the sheave assembly 24, 26 with respect to the other sheave of that assembly along the axis of the shaft on which it is supported.

A fixed ratio is provided by a fixed reduction mechanism 25, which includes a planetary gearset 29, symmetrically disposed about the axis of output shaft 12. The planetary gearset 29 includes a planetary carrier 32 driveably connected to the output shaft 12 through a one-way clutch 30. The gearset includes a sun gear 34, rotatably supported by output shaft 12; a ring gear 36, surrounding the sun gear 34; and a set of planet pinions 38, supported rotatably on carrier 32, in meshing engagement with the sun gear 34; in continuous meshing engagement with ring gear 36. Ring gear 36 is preferably grounded, but in an alternative embodiment, ring gear 36 is releasably held against rotation by an hydraulically actuated brake (not shown), which may be a multiple friction disc brake, or a brake band, and thereby effectively disconnect the planetary gearset from the output shaft 12, and thereby eliminate the need for the one-way clutch 30. An input sprocket 40 is fixed to the input shaft 22. Sprocket 40 drives a first chain 43 drivably connected to a second sprocket 45 fixed to the sun 34. One skilled in the art recognizes the chain 43 and sprockets 40, 45 may be replaced by a belt and associated pulleys.

The fixed mechanism 25 is contained on only two axes, provided by the input shaft 22 and output shaft 12. The input to the first reduction, sprocket 40, is rotatably supported on the axis of rotation of input shaft 22. The output, carrier 32, is supported by output shaft 12 on a second axis. Because the drive is performed without an idler gear, no intermediate axis is necessary between the sprockets 40 and 45. Therefore, the distance occupied by the mechanism is reduced by the space otherwise occupied by the idler.

In a preferred embodiment, as illustrated in FIG. 1, the planetary gearset is continually driven by the input shaft 22. The planetary gearset illustrated in FIG. 1 drives the output shaft 12 as long as the output shaft 12 does not overrun clutch 30. Because the present arrangement uses a chain between the input and output, no idler is required and therefore a compact arrangement is provided on only two axes, contrasted to an arrangement where an idler is provided between the input shaft and output shaft.

One skilled in the art recognizes that several variations are possible from the embodiment described in FIG. 1. For example, although not shown here, if the ring gear were not fixed but instead driven by a pinion gear provided on the input shaft 22, one could fix the carrier and take the output from the sun gear through a one-way clutch in a similar manner. Further, the planetary gearset 29 could be replaced by a second sprocket to achieve a desired reduction if the input and output shafts 12, 22 could be properly spaced or a further reduction could be otherwise achieved.

In a further alternative embodiment, although not illustrated here, the planetary gearset illustrated in the Figures may be placed on the first axis, similar to the planetary gearset provided in FIG. 1 of copending patent application Ser. No. 08/697,964. In this embodiment, the gear arrangement 48, 52, 56, 58 would be replaced by a first sprocket on shaft 50 and a second sprocket on output shaft 12, having an overrunning clutch provided between the input and outputs.

Referring again to FIG. 1, during operation of the transmission, an hydraulically actuated mode clutch 62 releasably connects sheave 24 and input shaft 22. When mode clutch 62 is not engaged, torque is transmitted from input shaft 22 through sprocket 40, chain 43, sprocket 45, planetary gearset 29, one-way clutch 30 to output shaft 12 and through a final drive mechanism 33, described below. When mode clutch 62 is engaged, torque is transmitted from input shaft 22 through clutch 62 to third shaft 50, to sheave 24, belt 28, sheave 26, to output shaft 12 and final drive mechanism 33. When the speed of output shaft 12 exceeds the speed of the carrier 32, the one-way clutch 30 is overridden.

The final drive mechanism 33, shown in FIG. 1, includes a chain and sprocket arrangement 35, having a first final drive sprocket 37 driving a second final drive sprocket 39 through a chain 41. Second final drive sprocket 39 is fixed to a second output shaft 47 which drives a forward-reverse planetary gearset 51. The forward-reverse planetary gearset 51 includes a forward clutch 55 to lock the carrier 57 to the shaft 47 for a direct drive. To achieve reverse, forward clutch 55 is released and reverse clutch 53 locks the planetary ring gear against rotation. Reverse clutch 53 may be a friction band or a friction disc. The carrier 57 drives third output shaft 59 which engages a final planetary reduction gearset 61 to achieve the final drive ratio.

The planetary gearset 61 drives a differential 76, which drives a pair of axle shafts 84, 86. Copending patent application Ser. No. 08/697,964, which is incorporated herein by reference in its entirety, describes these components in more detail. One skilled in the art recognizes the forward-reverse mechanism and final drive mechanism may take one of many known forms, including those described in copending patent application Ser. No. 08/697,964.

Figure 2:
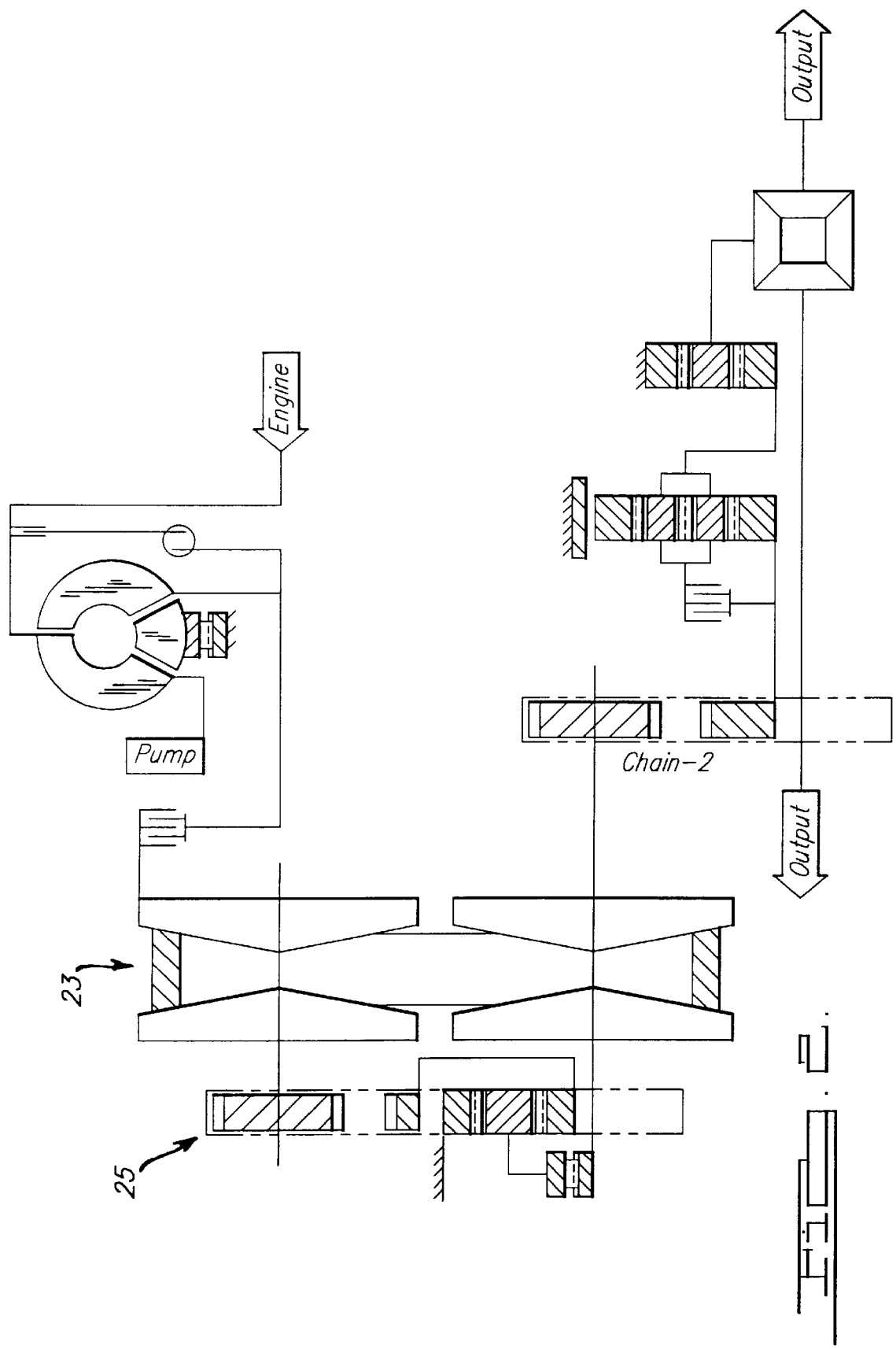
FIG. 2 is a schematic diagram of an alternative arrangement of the transmission of FIG. 1.
Figure 3:
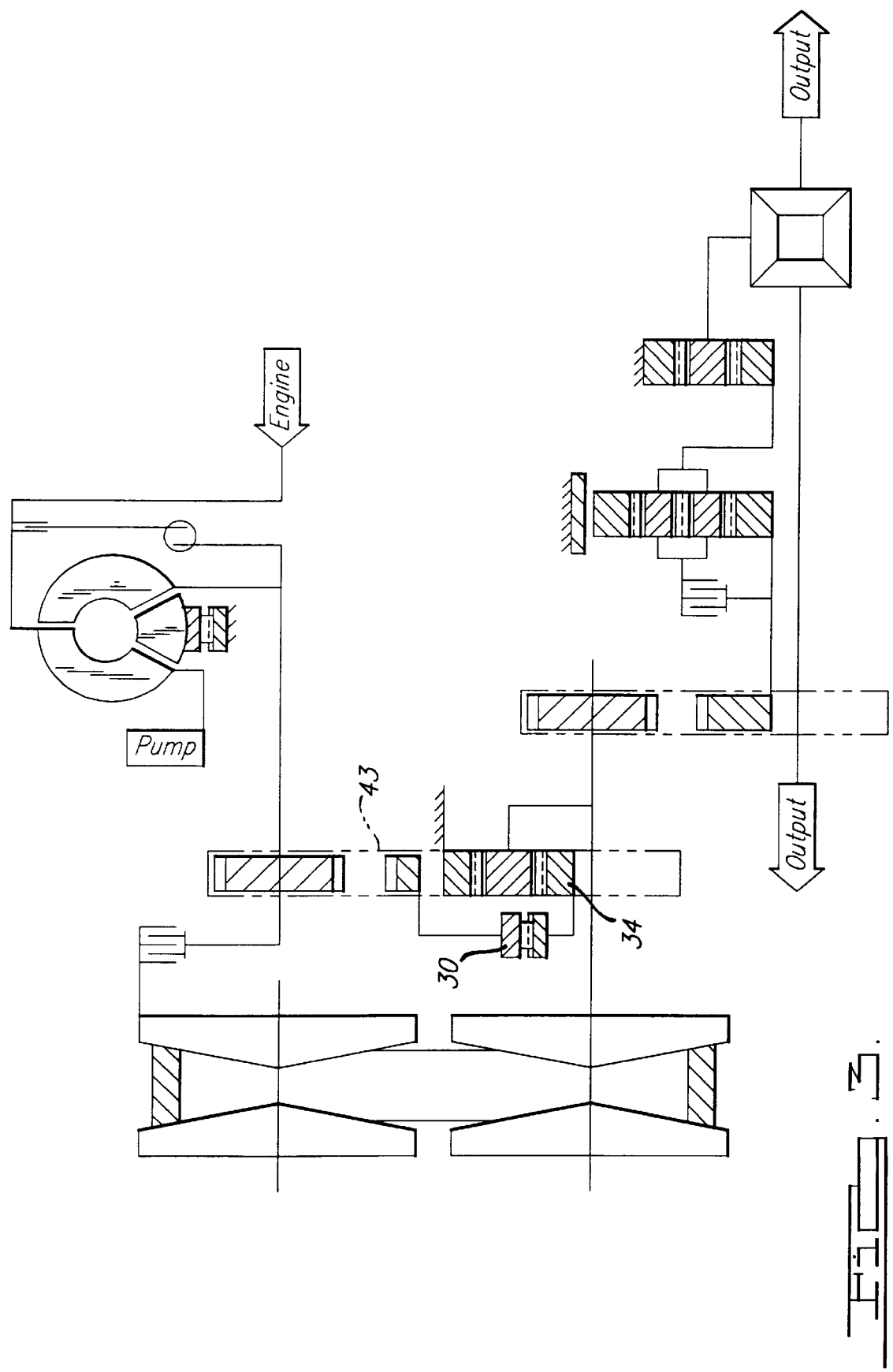
FIG. 3 is a schematic diagram of a further alternative arrangement of the transmission of FIG. 1.

FIGS. 2 and 3 show alternate embodiments for the fixed ratio and variable ratio components. In FIG. 2, the position of the variable speed mechanism 23 and fixed reduction mechanism 25 are reversed. FIG. 3 illustrates a variation of the device shown in FIG. 1, but the one-way clutch 30 is provided between the belt 43 and sun 34, thereby minimizing any losses across the planetary gearset 29 when the clutch 30 is overrun.

Figure 4:
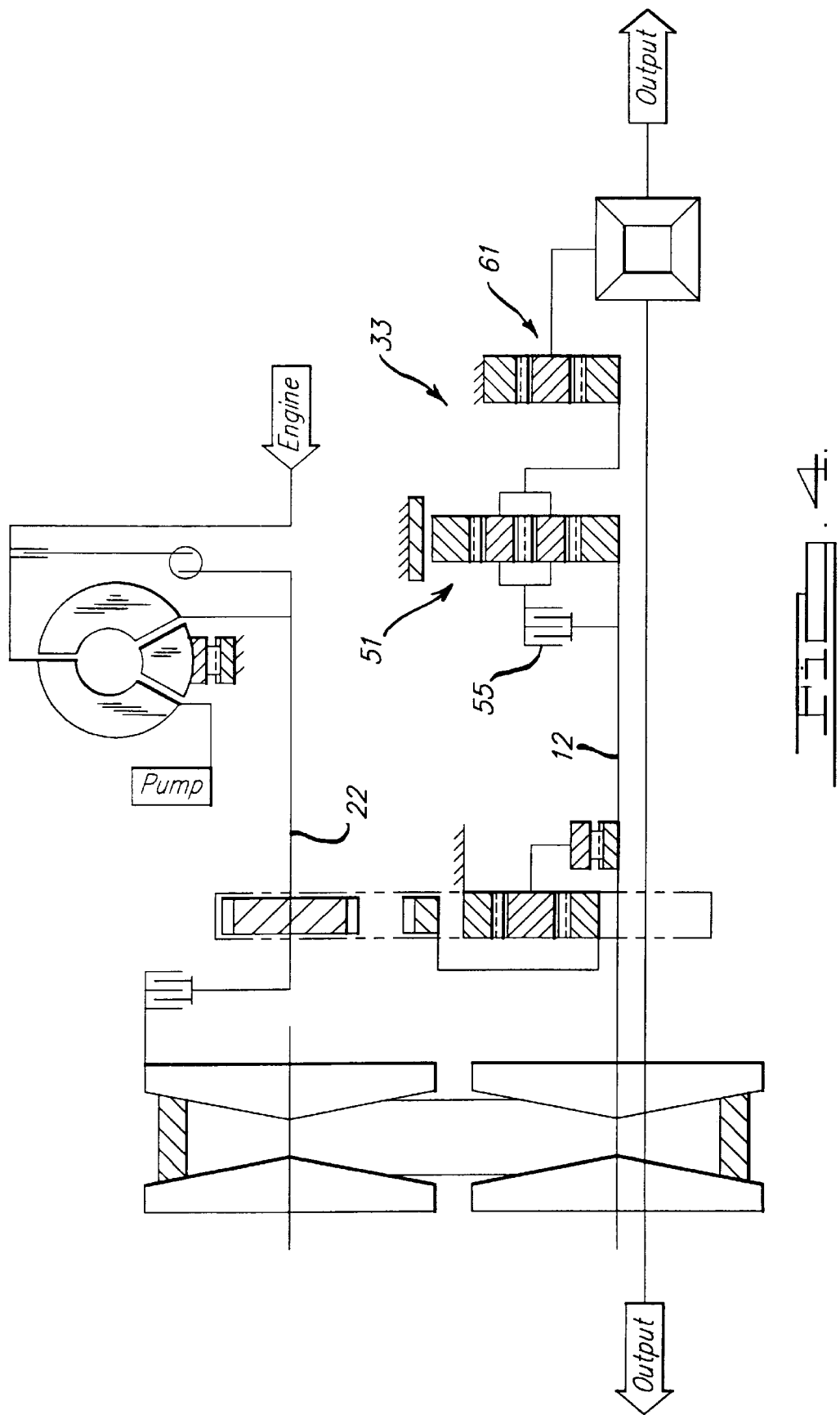
FIG. 4 is a schematic diagram of a U-drive arrangement of the transmission of FIG. 1.
Figure 5:
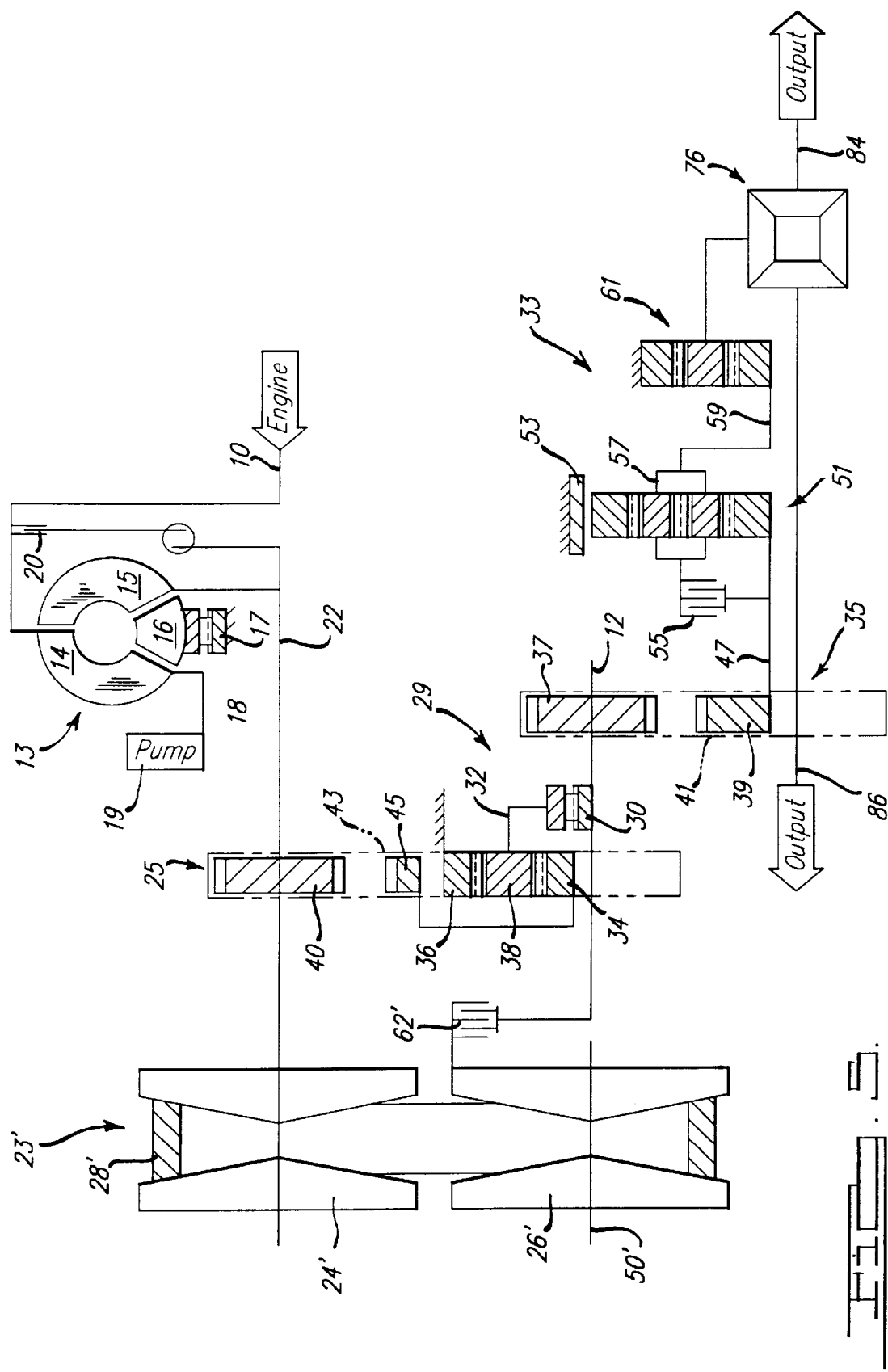
FIG. 5 is a schematic diagram of an alternative arrangement of the transmission of FIG. 1.

FIG. 4 illustrates another embodiment of the arrangement shown in FIG. 1, but the final drive mechanism 33 has been modified to lie on the second axis to further minimize the size of the entire transmission.

A more detailed description of the operation of the transmission shown in FIG. 1 follows. A motor vehicle driven through this transmission is accelerated from rest by disengaging mode clutch 62 and torque converter bypass clutch 20. Sprocket 25 is driven at the speed of shaft 22. With the transmission disposed in this way, one-way clutch 60 completes a one-way drive connection between shaft 22 and output shaft 12 through the low gear fixed reduction drive mechanism 25. Power is transmitted through the torque converter 13 to shaft 22, sprocket 40, chain 43, sprocket 45, sun 34, planets 38, carrier 32, one-way clutch 30, output shaft 12, final drive mechanism 33, and differential mechanism 76 to shafts 84, 86.

An upshift from low gear results by engaging mode clutch 62 and disposing the drive belt mechanism at the extremity of its underdrive range. With the transmission so disposed, one-way clutch 30 overruns.

The torque delivery path includes crankshaft 10, torque converter 13, shaft 22, mode clutch 62, the belt drive mechanism, output shaft 12, final drive gearing 61, differential mechanism 76, and shafts 84, 86.

Thereafter, the belt drive mechanism can operate over its full range to the maximum overdrive extremity of that range by continually changing the position of drive belt 28 on sheaves 24, 26.

The final drive mechanism 33, shown in FIGS. 1–3, operates in the manner described above, such that during forward drive, forward clutch 55 is engaged, producing a direct drive across forward-reverse planetary gearset 51. To produce reverse, mode clutch 62 and forward clutch 55 are disengaged and reverse clutch 53 is engaged. The forward-reverse planetary gearset 51 then reverses the direction of rotation between the second output shaft 47 and third output shaft 59. In an alternative embodiment, reverse is produced by driving the output shaft 12 through the variable drive 23, instead of the fixed ratio 25 as described above.

Preferably, the stall torque ratio of the torque converter is in the range 2.0–2.3. When the transmission is operating in low gear ratio, the ratio of the speed of shaft 50 to the speed of shaft 12 is in the range 3.1–3.5. The lowest ratio of the speed of shaft 50 to the speed of shaft 12 produced by the drive belt mechanism is approximately 2.12; therefore, when an upshift from the low gear ratio produced by gearset 29 to the operating range produced by the belt drive mechanism 23 is completed, i.e., by engaging the mode clutch 62, the speed ratio produced by the transmission undergoes a step change to 2.12 from 3.1–3.5.

Referring now to FIG. 4, the final drive mechanism 33 is carried on the axis of the output shaft 12. The chain and sprocket arrangement 35 of FIG. 1 has been eliminated, and the forward clutch 55 directly engages the output shaft 12. The forward-reverse planetary gearset 51 and final planetary reduction gearset 61 are coaxial with the output shaft 12. Thus, the size of the transmission is minimized within the axes of the input shaft 22 and output shaft 12, and the mechanisms coaxial therewith.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

We claim:

1. A continually variable transmission for a motor vehicle driven by a power source, comprising:

an input shaft;

an output shaft;

a first drive mechanism having a first input on a first axis and a first output on a second axis, for producing a fixed ratio of the speed of said first input to the speed of said first output, the first input driving the first output without a torque transmission member interposed therebetween on an intervening axis;

a second drive mechanism arranged in parallel with the first drive mechanism, having a second input and second output, for producing a stepless, continually variable range of ratios of the speed of said second input to the speed of said second output, the second drive mechanism having a lowest ratio produced by the second drive mechanism, the lowest ratio being higher than the fixed speed ratio produced by the first drive mechanism;

a mode clutch for alternately driveably connecting and releasing either the members of a first group consisting of the first input and second input or the members of a second group consisting of the first output and second output; and means for driving the output shaft in the same direction as the input shaft and for reversing the direction of rotation of the output shaft relative to the direction of rotation of the input shaft.

2. The transmission of claim 1, further comprising a torque converter for producing a hydrodynamic connection between the power source and input shaft.

3. The transmission of claim 1, comprising:

a first shaft driveably connected to the first input;

a second shaft coaxial with the first shaft and driveably connected to the second input;

a third shaft disposed parallel to the first shaft and second shaft, and driveably connected to the first output and second output; and wherein the mode clutch alternately connects the first shaft and second shaft mutually and releases the first shaft and second shaft.

4. A continually variable transmission for a motor vehicle driven by a power source, comprising:

an input shaft;

an output shaft;

a first drive mechanism having a first input on a first axis and a first output on a second axis, for producing a fixed ratio of the speed of said first input to the speed of said first output, the first input driving the first output without a torque transmission member interposed therebetween on an intervening axis;

a first shaft driveably connected to the first output;

a second drive mechanism arranged in parallel with the first drive mechanism, having a second input and second output, for producing a stepless, continually variable range of ratios of the speed of said second input to the speed of said second output, the second drive mechanism having a lowest ratio produced by the second drive mechanism, the lowest ratio being higher than the fixed speed ratio produced by the first drive mechanism;

a second shaft concentric with the first shaft and driveably connected to the second output;

a third shaft disposed parallel to the first shaft and second shaft, and driveably connected to the first input and second input;

a mode clutch for alternately driveably connecting and releasing either the members of a first group consisting of the first input and second input or the members of a second group consisting of the first output and second outputs wherein the mode clutch alternately connects the first shaft and second shaft mutually and releases the first shaft and second shaft; and means for driving the output shaft in the same direction as the input shaft and for reversing the direction of rotation of the output shaft relative to the direction of rotation of the input shaft.

5. The transmission of claim 1, wherein the first drive mechanism comprises:

a first sprocket wheel fixed to the input shaft;
a second sprocket wheel supported by the output shaft for drivable engagement therewith;
a chain or belt driveably engaging the first and second sprocket wheels; and
a second clutch for producing the drive connection between the second sprocket wheel and output shaft.

6. The transmission of claim 5, wherein the first drive mechanism further comprises a planetary gearset carried by the output shaft and the second sprocket wheel is in driving engagement with the output shaft through the planetary gearset.

7. The transmission of claim 6, wherein the second clutch of the first drive mechanism comprises an overrunning clutch for producing a one-way drive between the input shaft and output shaft.

8. A continually variable transmission for a motor vehicle driven by a power source, comprising:
an input shaft;
an output shaft;
a first drive mechanism having a first input on a first axis and a first output on a second axis, for producing a fixed ratio of the speed of said first input to the speed of said first output, the first input driving the first output without a torque transmission member interposed therebetween on an intervening axis; the first drive mechanism comprising:
a first sprocket wheel fixed to the input shaft;
a second sprocket wheel supported by the output shaft for driveable engagement therewith;
a chain or belt driveably engaging the first and second sprocket wheels; and
a second clutch for producing the drive connection between the second sprocket wheel and output shaft;
a second drive mechanism arranged in parallel with the first drive mechanism, having a second input and second output, for producing a stepless, continually variable range of ratios of the speed of said second input to the speed of said second output, the second drive mechanism having a lowest ratio produced by the second drive mechanism, the lowest ratio being higher than the fixed speed ratio produced by the first drive mechanism;
a mode clutch for alternately driveably connecting and releasing either the members of a first group consisting of the first input and second input or the members of a second group consisting of the first output and second output; and
means for driving the output shaft in the same direction as the input shaft and for reversing the direction of rotation of the output shaft relative to the direction of rotation of the input shaft comprising:
a sun gear driveably connected to the output shaft;
a ring gear surrounding the sun gear;
a first set of planet pinions in continuous meshing engagement with the sun gear;
a second set of planet pinions in continuous meshing engagement with the ring gear and the first set of planet pinions;
a carrier rotatably supporting the pinion gears;
a forward-reverse clutch for alternately driveably connecting mutually and releasing the output shaft and carrier; and
a reverse brake for alternately holding the ring gear against rotation and releasing the ring to rotate freely.

9. The transmission of claim 1, wherein the first drive mechanism comprises:

a first sprocket wheel fixed to the input shaft;
a third shaft provided parallel the output shaft;
a second sprocket wheel supported by the third shaft for driveable engagement therewith;
a chain or belt driveably engaging the first and second sprocket wheels; and
a second clutch for producing the drive connection between the second sprocket wheel and third shaft.

10. A continually variable transmission for a motor vehicle driven by a power source, comprising:
an input shaft;
an output shaft;
a first drive mechanism having a first input on a first axis and a first output on a second axis, for producing a fixed ratio of the speed of said first input to the speed of said first output, the first input driving the first output without a torque transmission member interposed therebetween on an intervening axis comprising;
a first sprocket wheel fixed to the input shaft;
a third shaft provided parallel the output shaft;
a second sprocket wheel supported by the third shaft for driveable engagement therewith;
a chain or belt driveably engaging the first and second sprocket wheels; and
a second clutch for producing the drive connection between the second sprocket wheel and third shaft;
a planetary gearset carried by the third shaft and the second sprocket wheel is in driving engagement with the third shaft through the planetary gearset;
a second drive mechanism arranged in parallel with the first drive mechanism, having a second input and second output, for producing a stepless, continually variable range of ratios of the speed of said second input to the speed of said second output, the second drive mechanism having a lowest ratio produced by the second drive mechanism, the lowest ratio being higher than the fixed speed ratio produced by the first drive mechanism;
a mode clutch for alternately driveably connecting and releasing either the members of a first group consisting of the first input and second, input or the members of a second group consisting of the first output and second output; and
means for driving the output shaft in the same direction as the input shaft and for reversing the direction of rotation of the output shaft relative to the direction of rotation of the input shaft.

11. The transmission of claim 10, wherein the second clutch of the first drive mechanism comprises an overrunning clutch for producing a one-way drive between the input shaft and third shaft.

12. The transmission of claim 11, wherein the means for driving the output shaft in the same direction as the input shaft and for reversing the direction of rotation of the output shaft relative to the direction of rotation of the input shaft comprises:
a sun gear driveably connected to the output shaft;
a ring gear surrounding the sun gear;
a first set of planet pinions in continuous meshing engagement with the sun gear;
a second set of planet pinions in continuous meshing engagement with the ring gear and the first set of planet pinions;
a carrier rotatably supporting the pinion gears;

a forward-reverse clutch for alternately driveably connecting mutually and releasing the output shaft and carrier; and a reverse brake for alternately holding the ring gear against rotation and releasing the ring to rotate freely.

13. The transmission of claim 12, wherein the means for driving the output shaft in the same direction as the input shaft and for reversing the direction of rotation of the output shaft relative to the direction of rotation of the input shaft further comprises:

a third sprocket wheel fixed to the third shaft;

a fourth sprocket wheel supported by the output shaft for driveable engagement therewith; and a chain or belt driveably engaging the third and fourth sprocket wheels.

14. A continually variable transmission for a motor vehicle driven by a power source, comprising:

an input shaft;

a second shaft coaxial with the input shaft;

a third shaft parallel to the second shaft;

a mode clutch for alternately connecting the input shaft and second shaft mutually and for releasing the input shaft and second shaft;

a first drive mechanism driveably connected to the input shaft and third shafts for producing a fixed ratio of the speed of said first shaft to the speed of said third shaft, the first drive mechanism comprising an input sprocket drivably connected with the input shaft, an output sprocket drivably connected with the third shaft and a chain or roller engaged with the input sprocket and output sprocket; and a second drive mechanism driveably connected to the second shaft and third shaft, arranged in parallel with the first drive mechanism, for producing a stepless, continually variable range of ratios of the speed of said second shaft to the speed of said third shaft, the second drive mechanism having a lowest speed ratio, said lowest speed ratio being higher than said fixed speed ratio produced by the first drive mechanism.

15. A continually variable transmission according to claim 14, further comprising:

an output shaft; and means for driving the output shaft in the same direction as the input shaft and for reversing the direction of rotation of the output shaft relative to the direction of rotation of the input shaft.

16. A continually variable transmission for a motor vehicle driven by a power source, comprising:

an input shaft;

a second shaft coaxial with the input shaft;

a third shaft parallel to the second shaft;

a mode clutch for alternately connecting the input shaft and second shaft mutually and for releasing the input shaft and second shaft;

a first drive mechanism driveably connected to the input shaft and third shafts for producing a fixed ratio of the speed of said first shaft to the speed of said third shaft, the first drive mechanism comprising an input sprocket driveably connected with the input shaft, an output sprocket driveably connected with the third shaft and a chain or roller engaged with the input sprocket and output sprocket;

a second drive mechanism driveably connected to the second shaft and third shaft, arranged in parallel with the first drive mechanism, for producing a stepless, continually variable range of ratios of the speed of said second shaft to the speed of said third shaft, the second drive mechanism having a lowest speed ratio, said lowest speed ratio being higher than said fixed speed ratio produced by the first drive mechanism;

an output shaft; and means for driving the output shaft in the same direction as the input shaft and for reversing the direction of rotation of the output shaft relative to the direction of rotation of the input shaft comprising:

a sun gear driveably connected to a support shaft selected from the group consisting of the output shaft and the third shaft;

a ring gear surrounding the sun gear;

a first set of planet pinions in continuous meshing engagement with the sun gear;

a second set of planet pinions in continuous meshing engagement with the ring gear and the first set of planet pinions;

a carrier rotatably supporting the pinion gears;

a forward-reverse clutch for alternately driveably connecting mutually and releasing the support shaft and carrier; and a reverse brake for alternately holding the ring gear against rotation and releasing the ring to rotate freely.

17. A continually variable transmission according to claim 16, wherein the means for driving the output shaft in the same direction as the input shaft and for reversing the direction of rotation of the output shaft relative to the direction of rotation of the input shaft further comprises:

a third sprocket wheel fixed to the third shaft;

a fourth sprocket wheel supported by the output shaft for driveable engagement therewith; and a chain or belt driveably engaging the third and fourth sprocket wheels.

18. A continually variable transmission according to claim 17, further comprising a torque converter for producing a hydrodynamic connection between the power source and input shaft.

19. A continually variable transmission according to claim 18, wherein the mode clutch, upon connecting the input shaft and second shaft mutually drivably connects the second drive mechanism and drivably disengages the first drive mechanism, and upon disconnecting the input shaft, drivably engage the first drive mechanism and disengage the second drive mechanism.

20. A continually variable transmission according to claim 19, wherein the first drive mechanism comprises an overrunning clutch for producing a one-way drive between the input shaft and output shaft.

* * * * *